United States Patent
Khawer et al.

(10) Patent No.: US 10,303,636 B2
(45) Date of Patent: May 28, 2019

(54) ROUTING PAGING PACKETS IN A SYSTEM-ON-A-CHIP BASE STATION ARCHITECTURE

(71) Applicants: Alcatel-Lucent USA Inc., Murray Hill, NJ (US); Alcatel-Lucent, Boulogne-Billancourt (FR)

(72) Inventors: Mohammad R. Khawer, Lake Hopatcong, NJ (US); Mugur Abulius, Villejuif (FR)

(73) Assignees: Nokia of America Corporation, Murray Hill, NJ (US); Alcatel Lucent

( * ) Notice: Subject to any disclaimer, the term of this patent is extended or adjusted under 35 U.S.C. 154(b) by 559 days.

(21) Appl. No.: 15/056,062

(22) Filed: Feb. 29, 2016

(65) Prior Publication Data

US 2017/0249270 A1     Aug. 31, 2017

(51) Int. Cl.
   *G06F 13/00*  (2006.01)
   *G06F 13/40*  (2006.01)
   *G06F 13/36*  (2006.01)

(52) U.S. Cl.
   CPC .......... *G06F 13/4022* (2013.01); *G06F 13/36* (2013.01); *G06F 2213/0038* (2013.01)

(58) Field of Classification Search
   CPC .............................. G06F 13/36; G06F 13/4022
   See application file for complete search history.

(56) References Cited

U.S. PATENT DOCUMENTS

| | | | |
|---|---|---|---|
| 6,574,221 B1 | 6/2003 | Petersen | |
| 9,497,171 B2 | 11/2016 | Khosravi et al. | |
| 2004/0258008 A1* | 12/2004 | Inoue | H04W 68/00 370/312 |
| 2006/0174032 A1 | 8/2006 | Winchester et al. | |
| 2008/0045226 A1 | 2/2008 | Liu | |
| 2010/0185818 A1 | 7/2010 | Sheng | |
| 2012/0182929 A1 | 7/2012 | Chen et al. | |
| 2012/0264470 A1 | 10/2012 | Bajj et al. | |
| 2013/0179446 A1 | 10/2013 | Lv | |
| 2014/0006908 A1 | 1/2014 | Gruber et al. | |
| 2014/0105067 A1 | 4/2014 | Chen et al. | |

(Continued)

OTHER PUBLICATIONS

Non-Final Office Action dated Sep. 27, 2017 for U.S. Appl. No. 15/056,101, 15 pages.

(Continued)

*Primary Examiner* — Zachary K Huson

(57) ABSTRACT

A system-on-a-chip (SOC) board includes a first switch and a plurality of local system-on-a-chip (SOC) devices coupled to the first switch. Each local SOC device includes one or more scheduler for one or more carriers and one or more hardware queues for storing paging packets to be scheduled by the scheduler for wireless transmission. One of the local SOC devices is a transport SOC (TSOC) device that implements a call processing module that is configured to receive a paging packet, forward a copy of the paging packet for storage in a hardware queue associated with each scheduler in the TSOC device that has registered to receive paging packets, and provide a copy of the paging packet to the first switch in response to one or more of the schedulers in the other local SOC devices registering to receive paging packets.

20 Claims, 5 Drawing Sheets

(56) References Cited

U.S. PATENT DOCUMENTS

2017/0250838 A1    8/2017   Khawer et al.
2017/0251419 A1    8/2017   Khawer et al.

OTHER PUBLICATIONS

Non-Final Office Action dated Sep. 29, 2017 for U.S. Appl. No. 15/056,049, 11 pages.
Notice of Allowance dated Mar. 15, 2018 for U.S. Appl. No. 15/056,049, 8 pages.
Final Office Action dated Mar. 2, 2018 for U.S. Appl. No. 15/056,101, 18 pages.
Notice of Allowance dated Oct. 2, 2018 for U.S. Appl. No. 15/056,101, 32 pages.

* cited by examiner

ROUTING PAGING PACKETS IN A SYSTEM-ON-A-CHIP BASE STATION ARCHITECTURE

BACKGROUND

Field of the Disclosure

The present disclosure relates generally to wireless communication systems and, more particularly, to routing paging packets in a wireless communication system.

Description of the Related Art

Conventional base stations (which may also be referred to as eNodeBs) implement two types of processor boards: a controller board and one or more modem boards. A conventional controller board includes a network processing unit (NPU) to terminate a backhaul connection to a core network of the wireless communication system and a second processor that implements a protocol stack for processing protocols such as the packet data convergence protocol (PDCP), the general packet radio service (GPRS) tunneling protocol (GTP), Internet protocol security (IPSec), and the like. No baseband processing is typically performed on the conventional controller board. Instead, the modem board performs baseband processing of signals received over the air interface or signals to be transmitted over the air interface. The modem board includes one or more digital signal processors (DSPs) to handle physical layer (or Layer 1) operations and a separate multi-core processor is employed to perform higher layer (e.g., Layer 2 and Layer 3) operations. The controller board and the one or more modem boards each require additional dedicated devices such as read-only memory (ROM), random access memory (RAM) that may be implemented using double data rate (DDR) memory, or flash memory to store generic applications, an operating system image, and the like. Interfaces must also be provided between the controller board and the one or more modem boards. Each conventional modem board with a multi core processor and DSPs can support up to three carriers, so a base station with three modem boards can support up to nine carriers and approximately 2000 connected users.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
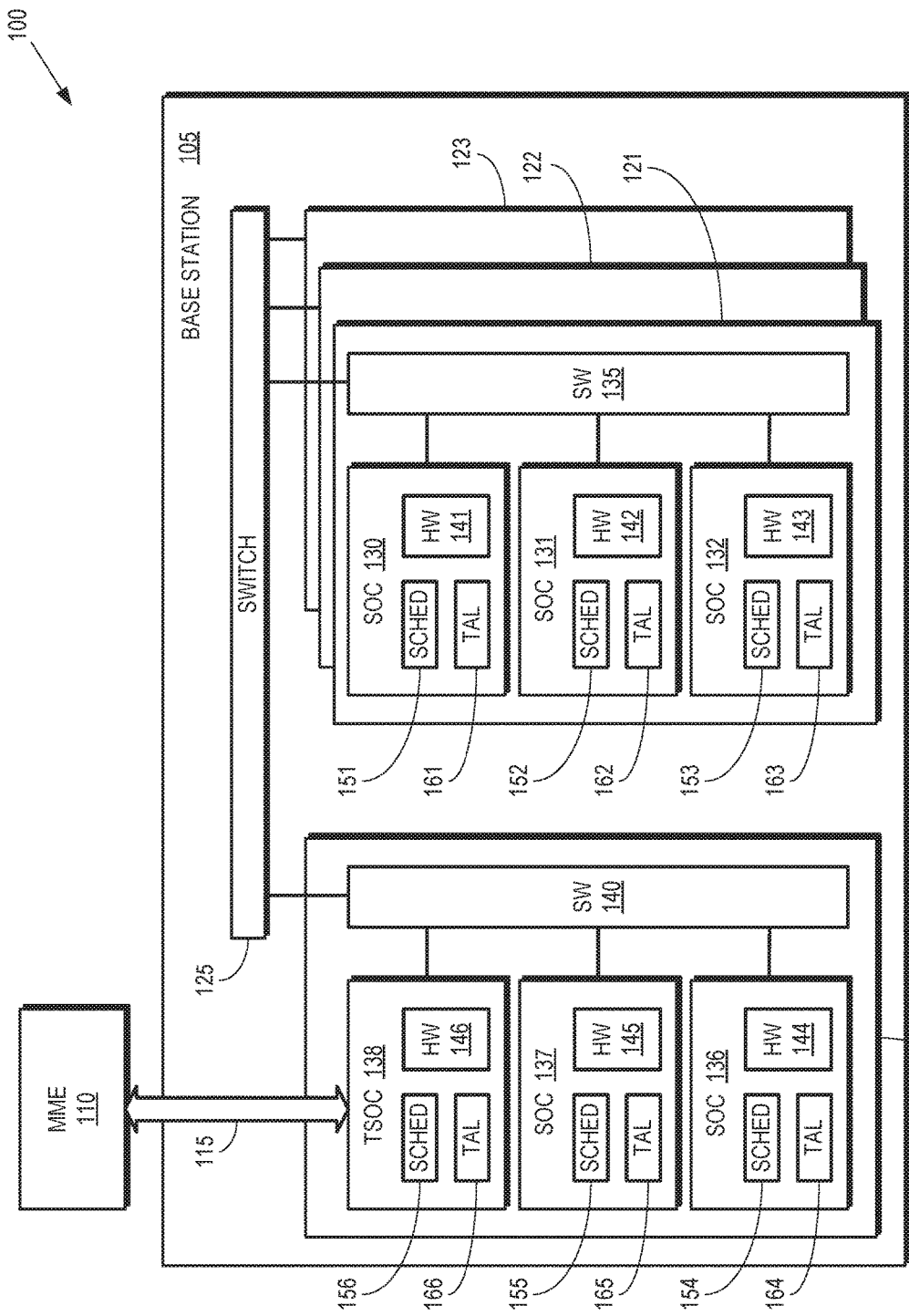
FIG. 1 is a block diagram of a wireless communication system according to some embodiments.

The controller board and the modem boards can each be replaced with a system-on-a-chip (SOC) board that can utilize one or more SOC devices. Each software-defined SOC board can be programmed to function as either a pure modem performing baseband processing or as a combined controller/modem board that terminates the backhaul interface and performs modem baseband processing for one or more carriers that are supported by one or more SOC devices. For example, one of the SOC boards hosts a transport SOC (TSOC) device that is programmed to terminate the backhaul interface. The TSOC device also supports up to three carriers and is implemented on a SOC board that hosts two additional SOC devices. The remainder of the SOC boards are programmed to support three SOC devices, which provide baseband processing for up to three carriers per SOC device. Thus, a base station that implements four SOC boards may support a total of up to 36 cellular carriers (a factor of four increase over the conventional eNodeB architecture) and may be capable of hosting up to approximately 40,000 active users (a factor of twenty increase in capacity over the conventional eNodeB architecture). Consolidating the functionality of the controller board and the modem boards onto a single SOC board also reduces the overall device count and the cost of goods sold (COGS) for each base station, as well as also potentially reducing the size, thermal dissipation, and packaging of the base station. For example, multiple SOC devices on each SOC board can be initialized using information stored in shared ROM, RAM, or flash memories.

Base stations are configured to forward paging messages over the air interface to idle user equipment, which may have camped on any of the carriers supported by the base station. Downlink schedulers that schedule downlink transmission of packets for each of the carriers supported by the base station can register to receive paging packets that arrive at the base station. The downlink schedulers can then schedule the paging packets for transmission over the air interface on the corresponding carriers. Base stations that implement the conventional controller/modem boards support a relatively small number of carriers and may therefore replicate each incoming paging packet that is received over the backhaul interface from the core network so that different copies of the incoming paging packet can be transmitted to the registered downlink schedulers over an internal backplane that interconnects the controller board and the modem boards. However, base stations that implement multiple SOC boards can support many more carriers, which require a correspondingly large number of downlink schedulers. Generating a copy of every packet for every registered downlink scheduler on all of the SOC boards would overwhelm the internal backplane interface with unnecessary and redundant paging packets.

To address this problem, SOC boards implement an enhanced paging packet replication function that uses a combination of multicasting paging packets and then selectively replicating the paging packets at intermediate switches or at the SOC devices that host the registered schedulers to ensure that each incoming paging packet results in transmission of a single paging packet on the internal backplane irrespective of the number of registered carriers in the base station. A paging packet can be efficiently routed from a backhaul interface to schedulers for carriers supported by one or more SOC devices that are connected by one or more switches by multicasting the paging packet to the one or more switches using a multicast address. In some embodiments, a paging module implemented by an SOC device receives one or more paging packets from the backhaul interface. For example, the paging module may be implemented by the TSOC that terminates the backhaul interface. The hardware acceleration engine of the TSOC replicates and forwards the paging packet to one or more switches according to previously configured parsing, classifying, and dispatching (PCD) rules.

Each switch may replicate the paging packet for transmission to schedulers on different SOC devices that have registered to receive the paging packet. For example, in response to booting up an SOC device, a transport abstraction layer (TAL) on the SOC device configures the one or more switches on the data path from the TSOC to replicate multicast paging packets onto the port connected to the SOC device. The TAL on the SOC device also registers itself with the TAL on the TSOC device. Some embodiments of a scheduler on an SOC device register with a TAL on the TSOC device to indicate readiness to receive paging packets. The TAL then configures the hardware acceleration engine on the SOC device with appropriate PCD rules to deliver a copy of each ingress paging packet to the scheduler via a corresponding hardware queue. Since each SOC device is capable of supporting up to three carriers, there may be up to three schedulers configured on each SOC device and paging packets may therefore be queued on three corresponding hardware queues. The TAL also configures the SOC device to accept paging packets with a multicast address and configures the switches to provide a copy of the multicast paging packet including the multicast address to each port that is connected to an SOC device with at least one registered scheduler.

FIG. 1 is a block diagram of a wireless communication system 100 according to some embodiments. The wireless communication system 100 includes a base station 105 that can support wireless communication over an air interface with one or more user equipment. The base station 105 is connected to a mobility management entity (MME) 110, as well as other entities in the core network, via a backhaul interface 115, which may be implemented using cables, optical fibers, wireless links, and the like. The backhaul interface 115 conveys signaling such as downlink packets (including paging packets) for transmission over the air interface by the base station 105 and uplink packets received by the base station 105 over the air interface. For example, the MME 110 may support a stream control transmission protocol (SCTP) to support datagram delivery according to the Internet Protocol (IP) and an S1 application part (S1AP) protocol for managing radio bearers, performing context transfers, mobility functions, paging, and the like. Other signaling such as configuration information may also be exchanged between the base station 105 and the MME 110 over the backhaul interface 115.

The base station 105 includes a plurality of boards 120, 121, 122, 123 that are referred to herein as system-on-a-chip (SOC) boards 120-123. The SOC boards 120-123 are interconnected by a switch 125, which is an Ethernet switch in some embodiments. Each of the SOC boards 120-123 includes a plurality of SOC devices that are configured to support one or more carriers for wireless communication over the air interface. For example, the SOC board 121 includes the SOC devices 130, 131, 132, which are referred to collectively as "the SOC devices 130-132." Each of the SOC devices 130-132 supports up to three independent carriers. Some embodiments of the base station 105 may include more or fewer SOC boards and each SOC board may include more or fewer SOC devices that support more or fewer carriers. A switch 135, which is an Ethernet switch in some embodiments, interconnects the SOC devices 130-132. The SOC board 120 includes the SOC devices 136, 137 and a transport SOC (TSOC) device 138, which is an SOC device that has been configured to terminate the backhaul interface 115. Thus, uplink and downlink packets that are conveyed over the backhaul interface 115 pass through the TSOC device 138, as discussed herein. The TSOC device 138 may also support up to three carriers for wireless communication. The SOC board 120 also includes a switch 140, which is an Ethernet switch in some embodiments. The SOC boards 121, 122, 123 also include SOC devices and an interconnecting switch, but these entities are not shown in FIG. 1 in the interest of clarity.

The SOC devices 130-132, 136-138 implement hardware (HW) acceleration engines 141, 142, 143, 144, 145, 146, which are referred to collectively as "the hardware acceleration engines 141-146." Some embodiments of the hardware acceleration engines 141-146 implement a security engine, a buffer manager, a frame manager, and a queue manager, as well as corresponding hardware queues and buffers, as discussed herein. The SOC devices 130-132, 136-138 also implement schedulers (SCHED) 151, 152, 153, 154, 155, 156 (referred to collectively as "the schedulers 151-156") and transport abstraction layers (TALs) 161, 162, 163, 164, 165, 166 (referred to collectively as "the TALs 161-166"). The schedulers 151-156 and the TALs 161-166 are implemented using a plurality of processor cores in the corresponding SOC devices 130-132, 136-138.

A call processing module (not shown in FIG. 1) on the TSOC device 138 routes paging packets to the schedulers 151-156 in the corresponding SOC devices 130-132, 136-138 in response to the schedulers 151-156 registering to receive the paging packets. Ethernet controllers on the SOC devices 130-132, 136-138 that include registered schedulers 151-156 are configured to accept paging packets transmitted on a multicast paging channel based on a multicast address. Some embodiments of the multicast address are a media access control (MAC) address. Paging packets may therefore be multicast through the wireless communication system 100 using the multicast address allocated to the paging channel.

Some embodiments of the call processing module use different procedures to handle the "local" scheduler 156 implemented on the TSOC device 138 and the "remote" schedulers 151-155 implemented on the remote SOC devices 130-132, 136, 137. For example, when the TSOC device 138 is initialized, powers on, or boots up, the local scheduler 156 registers with on the TSOC device 138 to receive paging packets received over the backhaul interface 115. The TAL 166 may then send parsing, classification, and dispatching (PCD) rules to configure the hardware acceleration engine 146 to route paging packets to the registered local scheduler 156. The hardware acceleration engine 146 routes paging packets by storing the paging packets in a hardware queue associated with the registered local scheduler 156. For another example, when the remote SOC device 130 is initialized, powers on, or boots up, the remote scheduler 151 registers with the call processing module on the TSOC device 138 to receive paging packets received over the backhaul interface 115. In response to receiving the registration from the remote scheduler 151, the call processing module provides one copy of each received paging packet using a multicast address for the paging packet to the switch 140. If any additional remote schedulers 152-155 register to receive paging packets, the call processing module still provides only one copy of each received paging packet to the switch 140 and relies on the switch 140 to replicate the multicast paging packets to the appropriate ports as necessary. If none of the remote schedulers 151-155 registers to receive paging packets, the call processing module does not provide any copies of received paging packets to the switch 140.

The switches 125, 135, 140 can be configured to replicate ingress multicast paging packets in response to one or more of the remote schedulers 151-155 registering to receive paging packets. For example, the TAL 165 on the SOC device 137 notifies the TAL 166 on the TSOC 138 that the corresponding scheduler 155 is registered to receive paging packets. The TAL 165 also programs the local switch 140 so that when the local switch 140 receives a multicast paging packet, it puts a copy of that multicast paging packet on the port that connects the SOC device 137 to the local switch 140. In response to receiving the notification, the TAL 166 on TSOC device 138 configures the backplane switch 125 to provide a copy of a received ingress multicast paging packet to a port of the backplane switch 125 that is connected to the SOC boards 121, 122, 123. The switch 140 only provides one copy of each received ingress paging packet to the port regardless of the number of registered schedulers on one or more remote SOC devices that may be attached to the port. The switch 140 relies on downstream elements to perform any necessary replication of the paging packet, as discussed herein. For another example, the TAL 161 on the SOC device 130 registers itself with the TAL 166 on TSOC 138 for receiving the ingress paging packets. The TAL 161 on the SOC device 130 then configures the local switch 135, while the TAL 166 on TSOC 138 configures the backplane switch 125, and the local switch 140 such that, upon receiving a multicast paging packet, each of these switches 125, 140 puts only one copy of the paging packet on the ports that are connected to the remote SOC device 130 where the corresponding scheduler 151 is registered to receive paging packets. In response to receiving the notification, the switches 125, 135, 140 are configured to provide a copy of each ingress paging packet to a port that corresponds to a downlink path from the TSOC device 138 to the SOC device 130. Each of the switches 125, 135, 140 only provides one copy of each received ingress paging packet to each port regardless of the number of registered schedulers attached to the port. The switches 125, 135, 140 rely on downstream elements to perform any necessary replication of the paging packet, as discussed herein.

Figure 2:
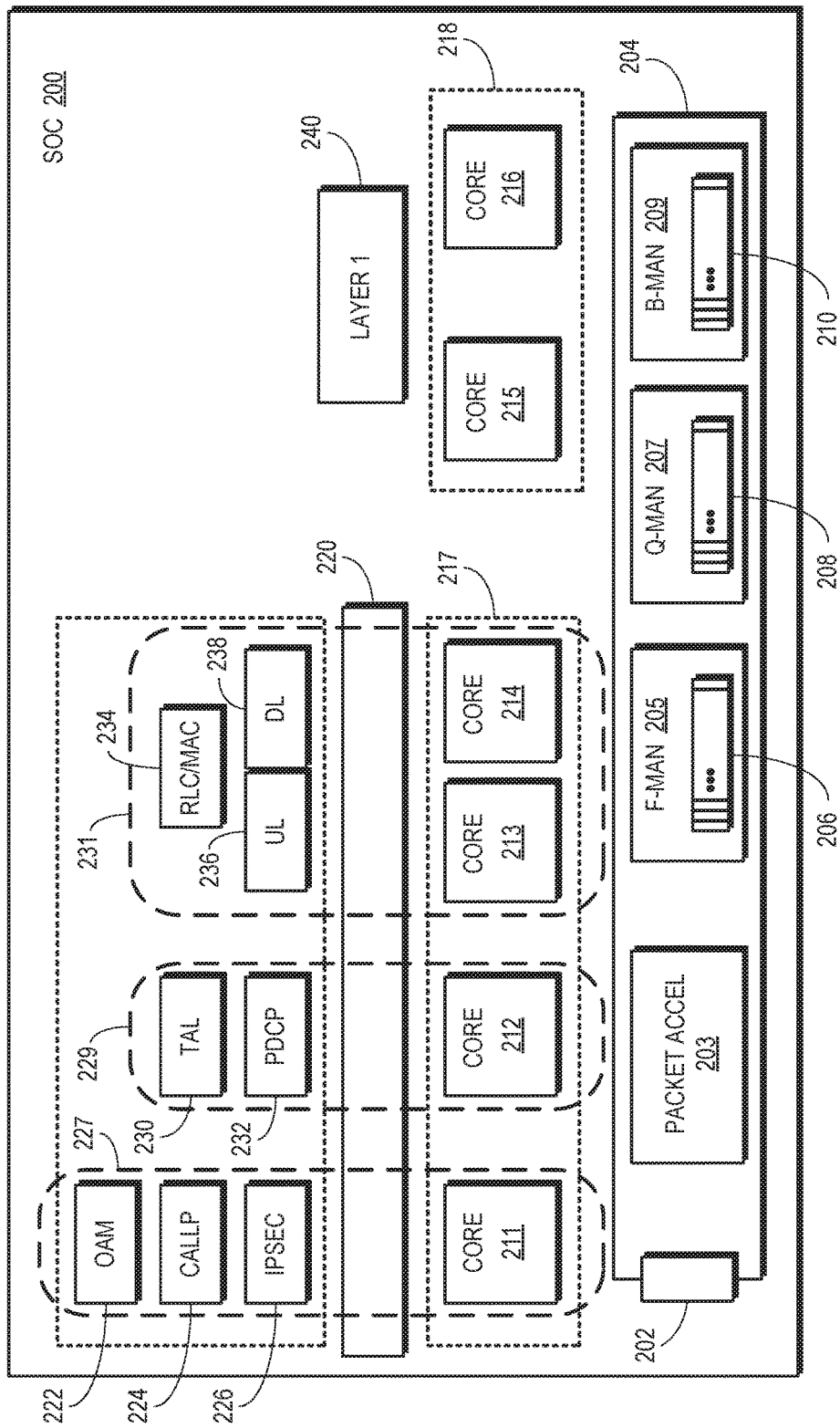
FIG. 2 is a block diagram of a system-on-a-chip (SOC) device according to some embodiments.

FIG. 2 is a block diagram of an SOC device 200 according to some embodiments. The SOC device 200 may be used to implement some embodiments of the SOC devices 130-132, 136-138 shown in FIG. 1. The SOC device 200 includes a hardware acceleration engine 204 that can be interconnected to other devices using the interface 202, which may be an Ethernet interface for connecting the SOC device 200 to an Ethernet switch or other devices. The hardware acceleration engine 204 includes a packet accelerator 203 that performs encryption or decryption of packets, e.g., according to the IPSec protocols. The hardware acceleration engine 204 also includes a frame manager (F-MAN) 205 for receiving and parsing packets, e.g., according to PCD rules configured on the hardware acceleration engine 204. The frame manager 205 has a corresponding hardware queue 206 that is used to queue packets that are to be provided to other entities in the SOC device 200. The hardware acceleration engine 204 further includes a queue manager (Q-MAN) 207 that is used to manage additional hardware queues 208, as discussed herein. The hardware acceleration engine 204 further includes a buffer manager (B-MAN) 209 that is used to perform buffering of packets using one or more buffers 210.

The SOC device 200 also includes a plurality of processor cores 211, 212, 213, 214, 215, 216, which are referred to herein as "the processor cores 211-216." In the illustrated embodiment, the processor cores 211-214 are implemented using a first type of processor such as PowerPC® cores and the processor cores 215, 216 are implemented using a second type of processor such as a digital signal processor 218. The processor cores 211-214 utilize a real time operating system (RTOS) 220, such as a symmetric multiprocessor (SMP) RTOS in a single partition configuration, as indicated by the dotted box 217. To achieve maximum system scalability, a single partition consisting of all the processing cores 211-214 may be defined that is served by the single RTOS instance 220.

Some embodiments of the SOC device 200 utilize core reservation and core affinity techniques to bond different types of threads and processes to different processor cores 211-216 to achieve logical partitioning 227, 229, 231 of real time, and non-real time processing on different cores within the single SMP partition 217 that contains the processing cores 211-214. For example, non-real-time threads and processes produced by an operations, administration, and management (OAM) module 222, a call processing (CallP) module 224 for paging user equipment, an IPSec module 226 for handling security, and other Layer 3 or higher layer modules may be bound to the processor core 211, as indicated by the dashed oval 227. Link layer (or Layer 2) modules that operate in real-time such as the TAL 230 and the PDCP module 232 for the SOC device 200 may be bound to the processor core 212, as indicated by the dashed oval 229. Other real-time operations that provide backhaul support may also be bound to the processor core 212. Schedulers such as Layer 2 schedulers that perform packet scheduling in real-time such as the radio link control (RLC)/media access control (MAC) scheduler 234, the uplink (UL) scheduler 236, and the downlink (DL) scheduler 238 may be bound to the processor cores 213, 214, as indicated by the dashed oval 231. Physical layer (or Layer 1) functionality 240 may be bound to the processor (DSP) cores 215, 216.

Some embodiments of the SOC device 200 are configured as a TSOC device. In these embodiments, the call processing module 224 is configured to receive paging packets for wireless transmission over an air interface, e.g., by receiving the paging packets from the MME 110 shown in FIG. 1. The SOC device 200 can then be interconnected with one or more other SOC devices via one or more switches such as the switches 125, 135, 140 shown in FIG. 1. The SOC device 200 implements schedulers 234, 236, 238 for each of the carriers supported by the SOC device 200. The schedulers 234, 238 can register with the call processing module 224 to receive the paging packets. The call processing module 224 may then replicate each paging packet to provide one copy of the paging packet for storage in hardware queues 206, 208 associated with each of the registered schedulers 234, 238. The TAL 230 also receives registrations from other SOC devices that are interconnected with the SOC device 200 by one or more switches. The call processing module 224 can be configured based on the registrations to provide a copy of the paging packet using multicast address to the switch that is directly coupled to the SOC device 200 (e.g., the switch 140 shown in FIG. 1) in response to at least one scheduler in the remote SOC devices registering to receive paging packets. As discussed herein, the call processing module 224 only provides one copy of the paging packet to the switch regardless of the number of registered remote schedulers in the basestation 105.

Figure 3:
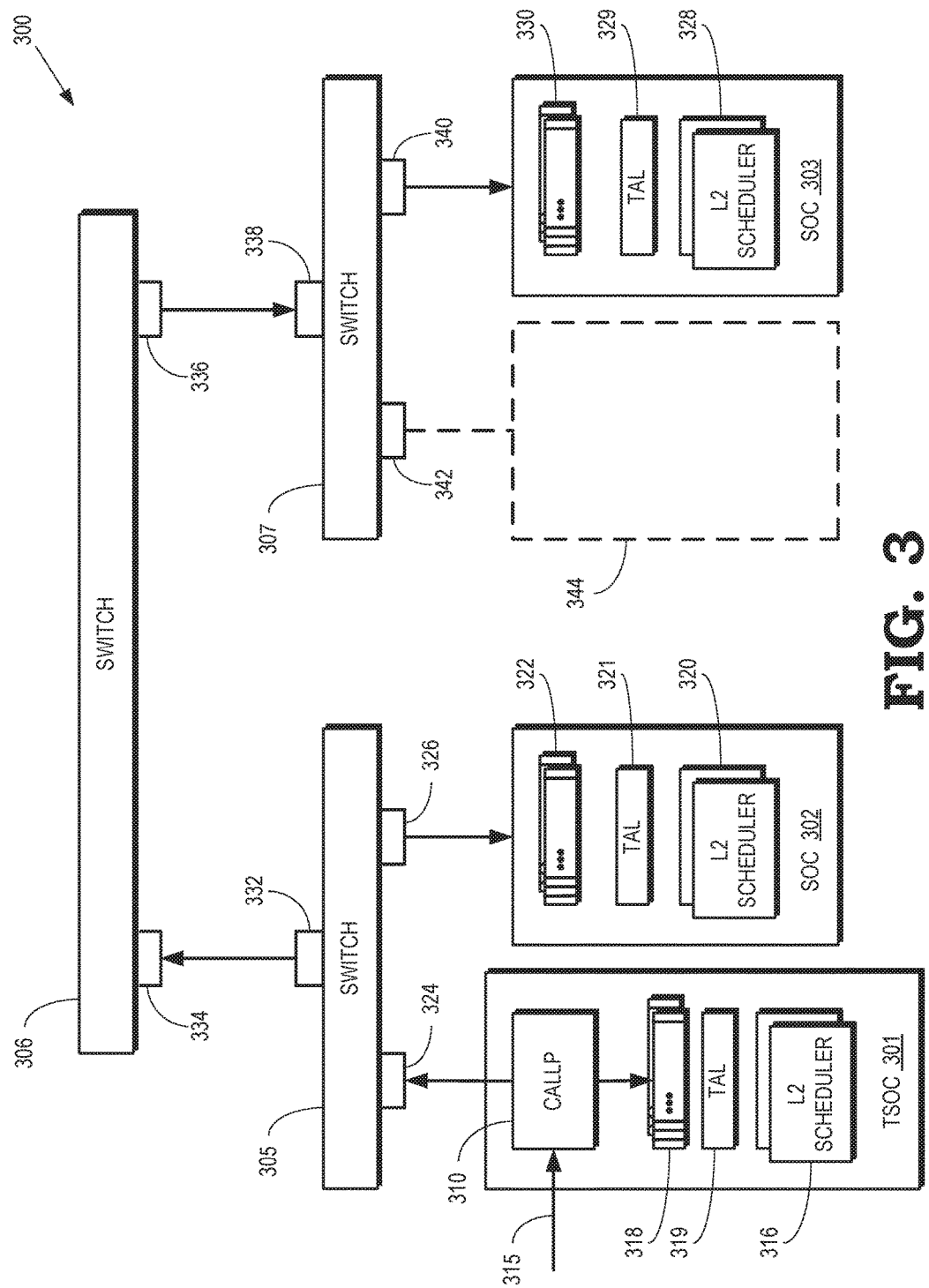
FIG. 3 is a block diagram of a wireless communication system including a transport SOC (TSOC) device that is interconnected with a plurality of SOC devices by switches according to some embodiments.

FIG. 3 is a block diagram of a wireless communication system 300 including a TSOC device 301 that is interconnected with a plurality of SOC devices 302, 303 by switches 305, 306, 307 according to some embodiments. The TSOC device 301 and the SOC devices 302, 303 may be referred to collectively as "the SOC devices 301-303." The switches 305, 306, 307 may be referred to collectively as "the switches 305-307." The SOC devices 301-303 may be used to implement some embodiments of the SOC devices 130-132, 136-138 shown in FIG. 1 and the switches 305-307 may be used to implement some embodiments of the switches 125, 135, 140 shown in FIG. 1.

The TSOC device 301 includes a call processing module (CallP) 310 that is configured to receive ingress paging packets, as indicated by the arrow 315. The TSOC device 301 is also configured to support two or more wireless carriers and so the TSOC device 301 includes two or more schedulers 316 and two or more corresponding hardware queues 318. The schedulers 316 may be Layer 2 (L2) schedulers such as the RLC/MAC scheduler 234 shown in FIG. 2. The TAL 319 on TSOC device 301 can receive registrations from one or more of the schedulers 316 and configure the TSOC device 301 two replicate ingress paging packets to provide to the corresponding hardware queues 318. For example, if one of the schedulers 316 has registered with the TAL 319 on the TSOC device 301 to receive paging packets, the call processing module 310 broadcasts one copy of each ingress paging packet using a multicast address and the configured PCD rule on the hardware acceleration engines on the TSOC device 301 by the TAL 319 put a copy of the paging packet in the corresponding hardware queues 318 associated with the registered local schedulers 316. If all the local schedulers 316 have registered with the call processing module 310 and the TAL 319 to receive paging packets, the PCD rule configured on the hardware acceleration engine by the TAL 319 provides one copy of each ingress packet to each of the hardware queues 318 corresponding to all the registered local schedulers 316. The operating system of the TSOC device 301 is not involved in providing the replicated copies to the hardware queues 318 because they are provided directly from the hardware acceleration engine in the TSOC device 301.

The SOC device 302 is configured to support two or more wireless carriers and so the SOC device 302 includes two or more schedulers 320 and two or more corresponding hardware queues 322. The SOC device 300 and to also includes a TAL 321. The schedulers 320 may be Layer 2 (L2) schedulers such as the RLC/MAC scheduler 234 shown in FIG. 2. The schedulers 320 can register to receive ingress paging packets from the call processing module 310 and the TAL 321, which may provide paging packets to the port 324 of the switch 305 in response to receiving the registration. The ports 324 (as well as all other ports illustrated in FIG. 3) may be a physical port or a logical port. The TAL 321 configures the switch 305 so that the switch 305 replicates paging packets received at the port 324 and provides a copy of the paging packets with the multicast address to the port 326. A single copy of each ingress paging packet is provided to the port 326 regardless of the number of registered schedulers 320 associated with the port 326. For example, if two or more of the schedulers 320 are registered to receive paging packets, a single packet is provided to the port 326 and a hardware acceleration engine in the SOC device 302 that is programmed with the appropriate PCD rule by the TAL 321 makes two or more copies of the paging packet and provides them to the corresponding hardware queues 322. The operating system of the SOC device 302 is not involved in providing the replicated copies to the hardware queues 322 because they are provided directly from the hardware acceleration engine in the SOC device 302.

The SOC device 303 is configured to support two or more wireless carriers and so the SOC device 303 includes two or more schedulers 328 and two or more corresponding hardware queues 330. The SOC device 303 also includes a TAL 329. The schedulers 328 may be Layer 2 (L2) schedulers such as the RLC/MAC scheduler 234 shown in FIG. 2. The schedulers 328 can register to receive ingress paging packets from the call processing module 310 and the TALs 329 and 319. The TAL 319 also sets up the downlink path for the paging traffic by programming the switches 305 and 306. The switch 305 is configured to provide paging packets to the port 332 in response to receiving the registration. The TAL 319 configures the switch 305 to replicate paging packets received at the port 324 on to the port 332 so that they can be provided to the port 334 of the switch 306. The TAL 319 also configures the switch 306 so that the switch 306 can replicate paging packets received at the port 334 on to the port 336 for provision to the port 338 of the switch 307. The TAL 329 configures the switch 307 so that the switch 307 can replicate paging packets received at the port 338 and provide a copy of the paging packet to the port 340 of the switch 307. A single copy of each paging packet is conveyed between the port 332 and the port 334, between the port 336 and the port 338, and from the port 340 to the SOC device 303. If two or more of the schedulers 328 are registered to receive paging packets, a hardware acceleration engine in the SOC device 303 makes two or more copies of the paging packet and provides them to the corresponding hardware queues 330. The operating system of the SOC device 303 is not involved in providing the replicated copies to the hardware queues 330 because they are provided directly from the hardware acceleration engine in the SOC device 303.

The switch 307 also includes a port 342 that can be used to attach one or more additional SOC devices. However, as indicated by the dashed box 344, there is no registered scheduler associated with an SOC device attached to the port 342. The absence of a registered scheduler may be due to the absence of an SOC device, the presence of an SOC device that has not been initialized, powered up, or booted up, or because none of the schedulers on the SOC device have provided a registration message to the call processing module 310. Since there is no registered scheduler associated with the port 342, the switch 307 does not provide copies of ingress paging packets received at the port 338 to the port 342. The switch 307 may therefore bypass replicating the ingress paging packets for provision to the port 342. The switches 305, 306 may also bypass replicating ingress paging packets for provisions to ports (not shown) that are not attached or connected to SOC devices that include schedulers registered to receive paging packets.

Figure 4:
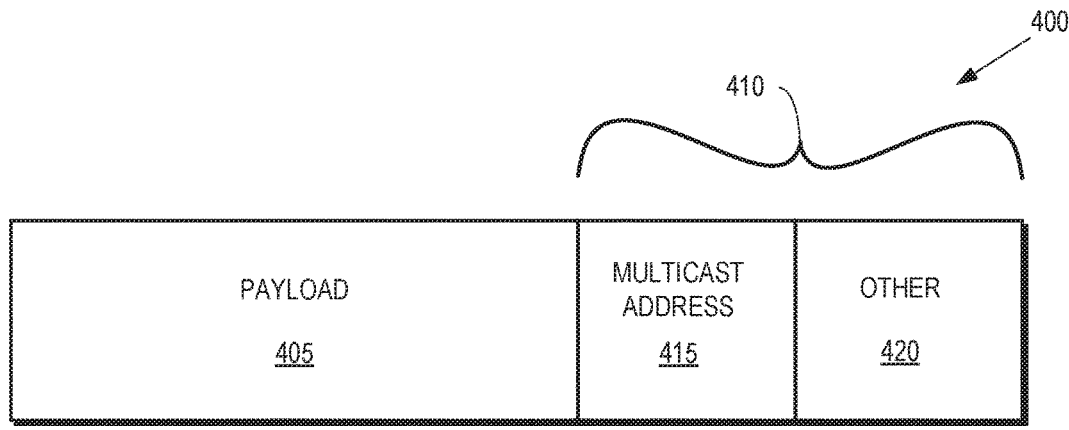
FIG. 4 is a diagram of a paging packet according to some embodiments.

FIG. 4 is a diagram of a paging packet 400 according to some embodiments. The paging packet 400 includes a payload 405 and a header 410. Some embodiments of the payload 405 include information identifying user equipment that is being paged using the paging packet 400. For example, the payload 405 may include an International Mobile Subscriber Identity (IMSI) of the user equipment. The header 410 includes a multicast address 415 that may be appended to the paging packet 400 by a call processing module such as the call processing module 224 shown in FIG. 2. Schedulers that have registered to receive paging packets may use the multicast address 415 to identify paging packets that have been addressed to the registered schedulers for transmission over the air interface by the corresponding SOC device. The multicast address 415 may be an MAC address associated with a paging channel. The header 410 may also include other information 420.

Figure 5:
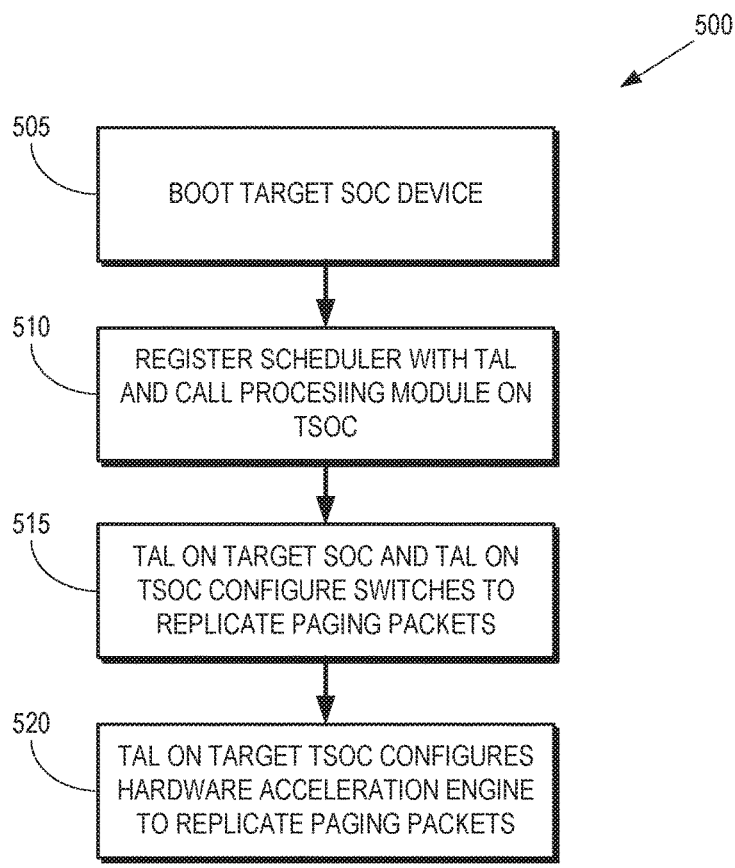
FIG. 5 is a flow diagram of a method for registering a target SOC device to receive paging packets according to some embodiments.

FIG. 5 is a flow diagram of a method 500 for registering a target SOC device to receive paging packets according to some embodiments. The method 500 may be implemented in some embodiments of the wireless communication system 100 shown in FIG. 1 or the wireless communication system 300 shown in FIG. 3. The target SOC device is connected to one or more other SOC devices, including a TSOC device, using one or more switches such as the switches 125, 135, 140 shown in FIG. 1 or the switches 305-307 shown in FIG. 3. At block 505, the target SOC device is booted up, e.g., in response to powering up the target SOC device or following a reboot of the target SOC device. At block 510, one or more schedulers in the target SOC device using the local TAL transmit a registration message to the TAL and the call processing module in the TSOC to register to receive paging packets. The TAL on the target SOC device configures the local hardware acceleration engines with the appropriate PCD rules to accept paging packets associated with a multicast address that is used by the target SOC device to multicast the paging packets.

At block 515, the TAL on the target SOC device and the TAL on the TSOC configure one or more switches along the path from the TSOC to the target SOC device to replicate the paging packets and provide copies of the paging packets to corresponding ports of the switches. For example, if the target SOC device is connected to a port of one of the switches that was not previously connected to an SOC device that included a registered scheduler, the switch may increase the number of copies of the paging packets that are produced by the replication process so that the additional copy of the paging packet can be provided to the port. The number of copies of the paging packets that are produced by the replication process may be reduced in response to one of the SOC devices disconnecting, powering down, or otherwise causing the corresponding schedulers to de-register so that they no longer receive paging packets.

At block 520, the TAL on the target SOC device configures its hardware acceleration engine to replicate paging packets. The target SOC device receives a single copy of each paging packet regardless of the number of schedulers in the target SOC device that are registered to receive paging packets. If the target SOC device includes two or more schedulers that are registered to receive paging packets, the hardware acceleration engine is configured to make two or more copies of the received paging packet and store the copies in two or more hardware queues corresponding to the two or more schedulers. The paging packets can then be provided from the hardware queues to the corresponding schedulers as needed for scheduling for downlink transmission over the air interface.

Figure 6:
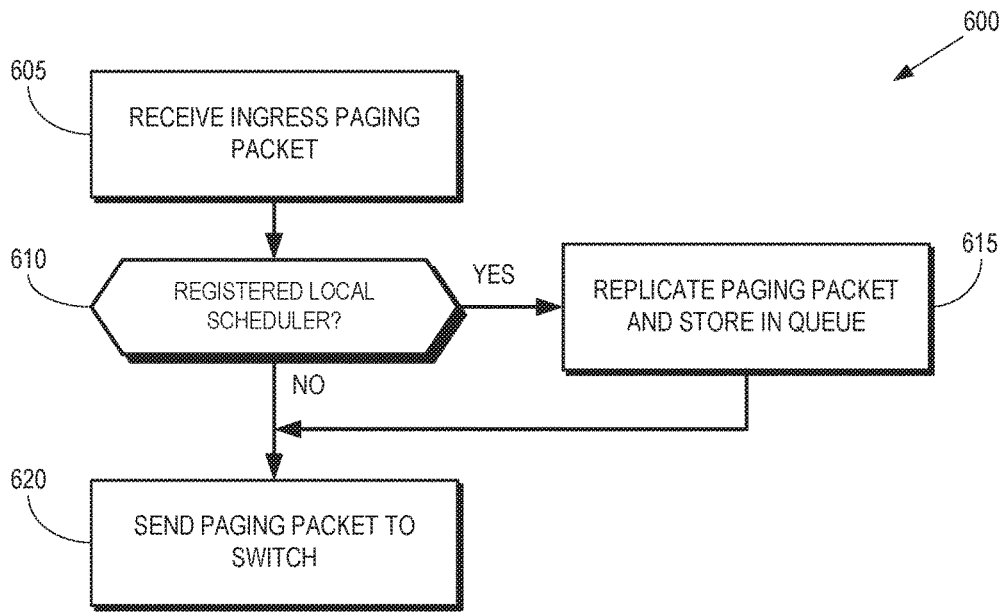
FIG. 6 is a flow diagram of a method of forwarding ingress paging packets according to some embodiments.

FIG. 6 is a flow diagram of a method 600 of forwarding ingress paging packets according to some embodiments. The method 600 may be implemented in some embodiments of the call processing module 224 shown in FIG. 2. At block 605, the call processing module receives an ingress paging packet. For example, the call processing module may be implemented in a TSOC device in a base station that includes multiple other SOC devices that are interconnected by one or more switches. The ingress paging packet is to be transmitted by one or more carriers supported by the TSOC device or the other SOC devices.

At decision block 610, the TAL on the TSOC determines whether one or more local schedulers implemented on the TSOC are registered to receive paging packets. If so, the PCD rule configured on the hardware acceleration engine of the TSOC replicates (at block 615) the paging packet so that a copy of the paging packet can be provided to a hardware queue associated with each of the registered local schedulers. If not, the method 600 flows to block 620. At block 620, the configured PCD rules on the hardware acceleration engine of TSOC sends one copy of the paging packet to a switch that is connected to the other SOC devices (or other switches) if at least one scheduler implemented by at least one of the other SOC devices has registered to receive paging packets. If no schedulers on any of the other SOC devices have registered to receive paging packets, the call processing module may bypass providing a copy of the paging packet to the switch.

Figure 7:
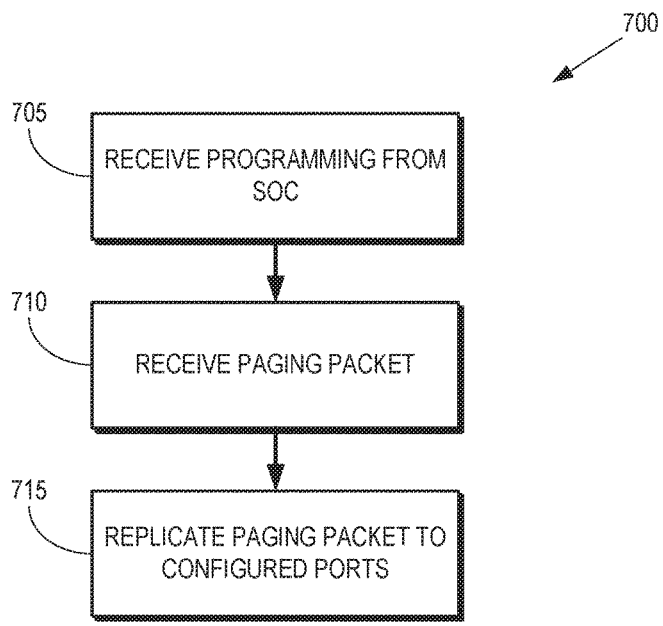
FIG. 7 is a flow diagram of a method for configuring a switch and replicating packets at the switch according to some embodiments.

FIG. 7 is a flow diagram of a method 700 for configuring a switch and replicating packets at the switch according to some embodiments. The method 700 may be implemented in some embodiments of the switches 125, 135, 140 shown in FIG. 1 or the switches 305-307 shown in FIG. 7. At block 705, the switch receives programming information from the TAL on SOC device such as one of the SOC devices 130-132, 136-138 shown in FIG. 1 or the SOC devices 301-303 shown in FIG. 3. For example, a TAL implemented in the SOC device may configure the switch in response to one or more schedulers in the SOC device registering to receive multicast paging packets. The programming information indicates that paging packets should be provided to the port that is connected to the SOC device. If no registered schedulers were previously associated with the port, the switch is configured to make an additional copy of ingress paging packets for provision to the port. If one or more registered schedulers are already associated with the port and the switch has been previously configured to replicate packets for provision to the port, the switch does not need to replicate any additional packets since only a single copy paging packet is to be provided to each port, regardless of the number of registered schedulers associated with the port.

At block 710, the switch receives a paging packet at an ingress port. At block 715, the switch replicates the paging packet to one or more configured ports that are associated with SOC devices that include registered schedulers. As discussed herein, the number of copies of the paging packet is equal to the number of ports that have at least one registered scheduler attached to the port. Thus, a single copy of the paging packet is provided to each of the ports as long as they have at least one attached registered scheduler. The switch may bypass providing a copy of the paging packet to any port that does not have any registered schedulers attached to the port.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method involving a base station that comprises a plurality of system-on-a-chip (SOC) devices that includes a transport system-on-a-chip (TSOC) device, comprising:
   receiving, at a call processing module implemented by the TSOC device that is interconnected with the other SOC devices via a switch that is implemented in the base station, a paging packet for wireless transmission;
   forwarding copies of the paging packet for storage in hardware queues associated with each scheduler in the TSOC that has registered to receive paging packets; and
   providing a copy of the paging packet to the switch in response to at least one scheduler in the other SOC devices registering to receive paging packets.

2. The method of claim 1, wherein providing the copy of the paging packet to the switch comprises multicasting the paging packet to the switch using a multicast address that is recognized by the schedulers that have registered to receive paging packets.

3. The method of claim 1, wherein the call processing module is hosted by at least one first processor core in the TSOC and wherein the at least one scheduler is hosted by at least one second processor core in the TSOC.

4. The method of claim 1, further comprising:
   configuring a hardware acceleration engine in the TSOC to store the copies of the paging packet in the hardware queues.

5. The method of claim 4, further comprising:
   configuring the hardware acceleration engine in the TSOC to provide the copy of the paging packet to the switch in response to the at least one scheduler in the other SOC devices registering to receive paging packets.

6. The method of claim 5, wherein configuring the hardware acceleration engine comprises receiving parsing, classifying, and dispatching (PCD) rules associated with schedulers that have registered to receive paging packets and configuring the hardware acceleration engine based on the PCD rules.

7. A method, comprising:
   receiving, at a switch that is implemented in a base station and connected to a plurality of system-on-a-chip (SOC) devices that are also implemented in the base station, a paging packet;
   replicating the paging packet to make a number of copies of the paging packet that is equal to a number of ports of the switch associated with schedulers on the SOC devices that are registered to receive paging packets via the ports of the switch for wireless transmission; and
   transmitting the copies of the paging packet via the corresponding ports.

8. The method of claim 7, further comprising:
   increasing the number of copies of the paging packet in response to receiving information indicating that one of the schedulers is registered to receive paging packets via a port of the switch that was not previously associated with a registered scheduler.

9. The method of claim 7, further comprising:
   decreasing the number of copies of the paging packet in response to receiving information indicating that one of the schedulers is no longer registered to receive paging packets via a port of the switch.

10. The method of claim 7, wherein receiving the paging packet comprises receiving the paging packet at the switch from a call processing module implemented by a transport SOC (TSOC) device that is interconnected with the plurality of SOC devices via the switch.

11. A base station comprising:
    a first switch; and
    a plurality of local system-on-a-chip (SOC) devices coupled to the first switch, wherein each local SOC device comprises:
       at least one scheduler for at least one carrier; and at least one hardware queue per scheduler for storing paging packets to be scheduled by the corresponding scheduler for wireless transmission;

and wherein one of the local SOC devices is a transport SOC (TSOC) device that implements a call processing module that is configured to:

receive a paging packet;

forward a copy of the paging packet for storage in a hardware queue associated with each scheduler in the TSOC that has registered to receive paging packets; and provide a copy of the paging packet to the first switch in response to at least one scheduler in the other local SOC devices registering to receive paging packets.

12. The base station of claim 11, wherein the TSOC device comprises a hardware acceleration engine configured to store the copy of the paging packet in the at least one hardware queue.

13. The base station of claim 12, wherein the hardware acceleration engine in the TSOC device is configured to provide the copy of the paging packet to the first switch in response to the at least one scheduler in the other local SOC devices registering to receive paging packets.

14. The base station of claim 13, wherein the hardware acceleration engine is configured based on parsing, classifying, and dispatching (PCD) rules received from transport abstraction layers (TALs) implemented by the local SOC devices associated with schedulers that have registered to receive the paging packets.

15. The base station of claim 11, wherein the first switch is configured to:

replicate the copy of the paging packet received from the call processing module to make a number of copies of the paging packet that is equal to a number of ports of the first switch associated with schedulers on the other local SOC devices that are registered to receive paging packets via the ports of the switch; and transmit the copies of the paging packet via the corresponding ports.

16. The base station of claim 11, further comprising:

a second switch coupled to a port of the first switch;

at least one third switch coupled to at least one first port of the second switch; and at least one remote SOC device coupled to at least one second port of the second switch.

17. The base station of claim 16, wherein the second switch is configured to receive a paging packet via the port of the first switch and route at least one copy of the paging packet to the at least one first port in response to at least one scheduler implemented by the at least one remote SOC device registering to receive paging packets.

18. The base station of claim 17, wherein at least one TAL implemented by the at least one remote SOC device is to configure the second switch to route the at least one copy of the paging packet to the at least one first port in response to the at least one scheduler registering to receive paging packets.

19. The base station of claim 17, wherein the second switch is configured to bypass providing the at least one copy of the paging packet to the at least one first port if the at least one scheduler is not registered to receive paging packets.

20. The base station of claim 16, wherein the first switch, the second switch, and the at least one third switch are Ethernet switches.

* * * * *